(12) United States Patent
Jerolm et al.

(10) Patent No.: US 11,947,475 B2
(45) Date of Patent: Apr. 2, 2024

(54) SYNCHRONIZED PROCESSING OF PROCESS DATA AND DELAYED TRANSMISSION

(71) Applicant: WAGO Verwaltungsgesellschaft mbH, Minden (DE)

(72) Inventors: Daniel Jerolm, Bad Essen (DE); Frank Quakernack, Bielefeld (DE); Hans-Herbert Kirste, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 18/101,802

(22) Filed: Jan. 26, 2023

(65) Prior Publication Data

US 2023/0161719 A1 May 25, 2023

Related U.S. Application Data

(63) Continuation of application No. 16/693,761, filed on Nov. 25, 2019, now Pat. No. 11,580,040, which is a
(Continued)

(30) Foreign Application Priority Data

May 24, 2017 (DE) ..................... 10 2017 208 835.4

(51) Int. Cl.
*G06F 13/16* (2006.01)
*G06F 13/374* (2006.01)
(Continued)

(52) U.S. Cl.
CPC ........ *G06F 13/1689* (2013.01); *G06F 13/374* (2013.01); *G06F 13/387* (2013.01); *G06F 13/4059* (2013.01); *G06F 13/4291* (2013.01)

(58) Field of Classification Search
CPC .. G06F 13/1689; G06F 13/374; G06F 13/387; G06F 13/4059; G06F 13/4291
See application file for complete search history.

(56) References Cited

U.S. PATENT DOCUMENTS 5,472,347 A 12/1995 Nordenstrom et al.
7,496,093 B2 2/2009 Mrasek
(Continued)

FOREIGN PATENT DOCUMENTS

CN 101859598 A 10/2010
CN 103560977 A 2/2014
(Continued)

OTHER PUBLICATIONS

International Search Report dated Aug. 7, 2018 in corresponding application PCT/EP2018/062963.
(Continued)

*Primary Examiner* — Phong H Dang
(74) *Attorney, Agent, or Firm* — Muncy, Geissler, Olds & Lowe, P.C.

(57) ABSTRACT

A data bus subscriber and a method for processing data, wherein the data bus subscriber can be connected to a local bus, particularly a ring bus, and the data bus subscriber has an input interface, which can be connected to the local bus, for receiving first local bus data, an output interface, which can be connected to the local bus, for transmitting second local bus data, a processing component for synchronous processing of the first local bus data and/or data stored in a memory and for output of at least one control signal, a logic unit, which is adapted in order to modify a quantity of received first local bus data based on the control signal in order to generate the second local bus data to be transmitted,
(Continued)

wherein the logic unit is further adapted for synchronous, delayed transmitting of the second local bus data via the output interface.

19 Claims, 4 Drawing Sheets

Related U.S. Application Data continuation of application No. PCT/EP2018/062963, filed on May 17, 2018.

(51) Int. Cl.
*G06F 13/38* (2006.01)
*G06F 13/40* (2006.01)
*G06F 13/42* (2006.01)

(56) References Cited

U.S. PATENT DOCUMENTS

| | | | |
|---|---|---|---|
| 8,269,537 B2 | 9/2012 | Bae et al. | |
| 8,497,718 B2 | 7/2013 | Bae et al. | |
| 9,126,729 B2 | 9/2015 | Hung et al. | |
| 9,436,212 B2 | 9/2016 | Jerolm | |
| 10,735,219 B2 | 8/2020 | Bunte et al. | |
| 10,846,419 B2 | 11/2020 | Bunte et al. | |
| 11,580,040 B2* | 2/2023 | Jerolm | H04L 12/422 |
| 2004/0221144 A1 | 11/2004 | Chino et al. | |
| 2005/0041691 A1 | 2/2005 | Laufer et al. | |
| 2007/0214336 A1* | 9/2007 | Shimura | G11C 7/225 |
| | | | 711/167 |
| 2013/0173868 A1 | 7/2013 | Layrer et al. | |
| 2013/0177026 A1* | 7/2013 | Soni | G06F 13/00 |
| | | | 370/463 |
| 2013/0232222 A1 | 9/2013 | Weber | |
| 2018/0176132 A1 | 6/2018 | Bunte et al. | |

FOREIGN PATENT DOCUMENTS

| | | |
|---|---|---|
| CN | 103701676 A | 4/2014 |
| CN | 106155638 A | 11/2016 |
| DE | 103 05 080 A1 | 8/2004 |
| DE | 10 2015 117 937 B3 | 1/2017 |
| DE | 10 2016 125 126 B3 | 3/2018 |

OTHER PUBLICATIONS

German Office Action dated Feb. 5, 2018 in corresponding application 102017208835.4.
International Preliminary Report on Patentability dated Dec. 5, 2019 in corresponding application PCT/EP2018/062963.
Tietze et al; "Halbleiter-Schaltungstechnik" 14. Auflage Berlin, Heidleberg Springer 2012 pp. 696-701 ISBN 978-3-642-31025-6.
EtherCat Wikipedia XP055490282.
Chinese Office Action dated Jun. 1, 2021 in corresponding application 201880034538.0.

* cited by examiner

SYNCHRONIZED PROCESSING OF PROCESS DATA AND DELAYED TRANSMISSION

This nonprovisional application is a continuation of U.S. application Ser. No. 16/693,761, which was filed on Nov. 25, 2019, which is a continuation of International Application No. PCT/EP2018/062963, which was filed on May 17, 2018, and which claims priority to German Patent Application No. 10 2017 208 835.4, which was filed in Germany on May 24, 2017, and which are both herein incorporated by reference.

BACKGROUND OF THE INVENTION

Field of the Invention

The present invention relates to the processing of data, and more particularly to the processing of local bus data on a data bus subscriber of a local bus.

Description of the Background Art

Data bus subscribers are mostly used in automation systems.

Automation systems are used in particular for the control of industrial plants, buildings and means of transport. For the control of an automation system, usually several sensors and actuators are necessary. These monitor and control the process performed by the installation. The different sensors and actuators of an automation system are often referred to as automation devices. These automation devices can either be connected directly to a control unit of the automation system or can first be connected to input and output modules, which are often referred to as I/O modules. These can in turn be connected directly to the control unit. The automation devices can either be integrated directly in the I/O modules or can be connected to them via cable or wirelessly.

The control of an automation system is usually accomplished with the help of one or more programmable logic controllers, PLC. The PLCs can be arranged hierarchically or decentrally in an automation system. There are different performance levels for the PLCs, so that they can take over different types of controls and regulating techniques depending on the computing and storage capacity. In the simplest case, a PLC has inputs, outputs, an operating system (firmware) and an interface via which a user program can be loaded. The user program defines how the outputs are to be switched as a function of the inputs. The inputs and outputs can be connected to the automation devices and/or the I/O modules and the process carried out by the automation system can be monitored or controlled by the logic stored in the user program. In this case, the monitoring of the process is accomplished by the sensors and the control of the process by the actuators. The control unit can also be referred to as a central controller or central unit and assumes control of at least one automation device or I/O module connected to the control unit.

However, direct connection of the automation devices to the at least one control unit or of the I/O modules to the at least one control unit in the form of a parallel wiring, i.e., when one line is routed from each automation device or each I/O module to the higher-level control unit, is very expensive. Especially in an increasing degree of automation in automation systems, the cabling effort increases with parallel wiring. This is associated with great cost in the design, installation, commissioning and maintenance.

For this reason, automation systems generally use bus systems today, by means of which the automation devices or the I/O modules can be connected to the control unit. Such subscribers of a bus system are also referred to as bus subscribers. Because data is exchanged on the bus system, bus subscribers are also often referred to as data bus subscribers. In order to further simplify the connection of the individual automation devices or the I/O modules to the bus system, nowadays individual groups of automation devices or I/O modules are initially interconnected to a local bus system with the help of a specialized local bus, and then at least one subscriber of this local bus is connected to the bus system, which is connected to the control unit. In this case, the local bus system may differ from the bus system, which is used to establish the connection with the control unit.

The subscriber of a group of local bus subscribers connected to the bus system of the control unit is often referred to as a local bus master. Alternatively, the term header of the local bus system is also used. In comparison to other local bus subscribers, this local bus master may contain further logic, circuits or functionalities which are necessary for connection to the bus system of the control unit. Also, the local bus master itself may include a PLC. This subscriber can also have logic and circuits for conversion between the two bus systems. The local bus master can therefore also be designed as a gateway or bus converter and it ensures conversion of the data provided in the format of one of the bus systems to the format of the local bus system and vice versa. In most cases, however, not mandatory, the local bus master is specialized in the connection of the local bus to the higher-level bus.

The local buses that are used are usually tailored to the specific operational requirements of the automation devices or I/O modules or take into account their special hardware design. The groups of automation devices or I/O modules of the local bus system usually form a subgroup of the automation system for performing a specific task in the process performed by the automation system. The data exchanged on the buses for the process is also often referred to as local bus data or process data, because this data includes information for regulating or controlling the process executed by the automation system. This data may include, among other things, measurement data, control data, status data and/or other information. Depending on the bus protocol used, this data can precede (header) or be appended to (tail) other data. This other data may include information regarding the data or include information with respect to internal communication on the local bus. Here, a variety of different information is known, which can precede or be added to the data according to the bus protocol used.

A ring bus is a specialized form of a local bus, as known for example from U.S. Pat. No. 5,472,347 A. In a ring bus, the data bus subscribers, for example the automation devices or I/O modules, are each connected to the data bus subscribers directly adjacent to them and data is forwarded in succession from one to the other data bus subscriber. The data transmitted on the local bus can also be referred to as local bus data. Thus, not all data bus subscribers are sent the data at the same time, but in succession, wherein a data bus subscriber receives data from its upstream data bus subscriber and forwards data to his downstream data bus subscriber. Between receiving the data and forwarding, the data bus subscriber can process the received data. When the data has reached the last data bus subscriber in the series, the data from the last data bus subscriber is returned back successively to the first data bus subscriber. The return can be performed either through all data bus participants or past them by means of a bypass line. The ring bus thus has a downflow and an upward flow of data. The data in a ring bus is usually transferred in the form of data packets that pass through all data bus subscribers.

In a ring bus, the data packet is forwarded from one to another data bus subscriber. At any given time, a data bus subscriber always receives only a portion of the data packet from its upstream data bus subscriber. When the data contained in this portion has been processed by the data bus subscriber, the portion is forwarded to the downstream data bus subscriber and at the same time, a new portion of the data packet is received by the upstream data bus subscriber. In this way, all portions of the data packet sequentially pass through all the data bus subscribers.

In this case, each data bus subscriber has a different processing time, that is, a different time between detecting the process data and the presence of a processing result. In the above-mentioned prior art, this different processing time is taken into account by each data bus subscriber having adaptive propagation delays. This means that the process data is buffered in the data bus subscriber until it has completed its processing, before the process data is forwarded to the next data bus subscriber.

SUMMARY OF THE INVENTION

It is therefore an object of the present invention to provide a data bus subscriber and a corresponding method that improve processing of the process data.

This object is achieved with a data bus subscriber and a method according to an exemplary embodiment.

A data bus subscriber is used for controlling or monitoring a process, in particular by outputting control signals, for example to actuators and/or by receiving measurement signals, for example from sensors. The data bus subscriber converts the control signals and/or measurement signals into process data for the local bus or vice versa. The data bus subscribers can also be referred to as local bus subscribers.

The data bus subscriber according to the invention for processing data can be connected to a local bus—that is to say adapted to be connected to the local bus—in particular a ring bus. In a local bus with data bus subscribers, data is transmitted in the form of data packets. The data packets can also be referred to as telegrams. A data packet has, for example, header, payload and, advantageously, a checksum. A data packet is advantageously a communication data packet or a process data packet.

A communication data packet contains no process data. Advantageously, a communication data packet contains data, in particular for programming and/or for controlling and/or for monitoring and/or for identifying at least one data bus subscriber. Advantageously, the communication data packet has an address which is assigned to at least one data bus subscriber. Preferably, the data bus subscriber is set up to evaluate the address.

A process data packet has process data that is sent and/or received by the data bus subscribers of the local bus, Advantageously, the process data packet has no address for transmitting the process data to or from a data bus subscriber in the local bus. In the process data packet, the process data is arranged, for example, in such a way that data bus subscribers can recognize the process data associated with the respective data bus subscriber based on the respective position of the process data in the process data packet, for example one or more bits within an associated contiguous data block (1 byte). Advantageously, the process data packet has an identifier (IDE) which is assigned to the type of the data packet, that is to say to the process data packet, and can be identified by the data bus subscriber. The process data can also be referred to as local bus data.

The data bus subscriber according to the invention has an input interface for receiving first local bus data and an output interface for transmitting second local bus data. In this case, the input interface can be connected, for example, to the local bus—that is, adapted to be connected to the local bus—and via the input interface, the data bus subscriber can, for example, receive first local bus data from an upstream data bus subscriber. In this case, the output interface can be connected, for example, to the local bus—that is to say adapted to be connected to the local bus—and via the output interface, the data bus subscriber can send second local bus data to a downstream data bus subscriber. The data bus subscribers themselves in this case form the local bus, wherein further elements, e.g., an end piece, can be provided. The upstream data bus subscriber can be a data bus subscriber which physically precedes the receiving data bus subscriber directly or indirectly in the local bus or is the local bus master, which represents, for example, the first data bus subscriber in the local bus. The downstream data bus subscriber may be a data bus subscriber that physically or indirectly follows the transmitting data bus subscriber in the local bus. The receiving and the transmitting of the first and second local bus data can be done with a specific, preferably constant bus clock. This bus clock accordingly indicates with which clock the data bus subscribers communicate. For example, a portion of the local bus data is received and transmitted per clock cycle. For example, the portion of the local bus data may be received or transmitted bit by bit and with each clock cycle, a certain number of bits may be received and transmitted. For example, one bit or 8 bits, i.e., byte, can be received and transmitted per clock cycle. However, there may be several clocks between receiving and transmitting, and transmitting and receiving always takes place within an integer number of clock cycles. In particular, the data bus subscriber must have time to process the first local bus data between the reception of the first local bus data and the transmission of the second local bus data in order to generate the second local bus data.

For processing data, in particular the first local bus data, the data bus subscriber according to the invention may have a processing component that is adapted for the synchronous processing of the first local bus data and or data stored in a memory and for outputting at least one control signal that controls a logic unit. The stored data may be stored in a memory, wherein the memory may be a component for retaining data. In this case, the component for storage may be part of the data bus subscriber, but alternatively it may also be external to the data bus subscriber, or an additional module to the data bus subscriber. The data bus subscriber need only have access to the component for storage.

The logic unit is adapted to modify at least a portion or a certain quantity of the first local bus data based on the control signal of the processing component for generating the second local bus data. The modification may involve a bit-by-bit change of the first local bus data currently present on the data bus subscriber. The change caused by the control signal may also be that no first local bus data is changed. That is to say, the first local bus data in this case passes through the data bus subscriber unchanged because, for example, the first local bus data is not addressed to the data bus subscriber, i.e., is not designed to cause the data bus subscriber to be controlled or regulated, but instead is addressed to another data bus subscriber. This, in this case, the processing component can generate a control signal instructing the logic unit to make no change to the first local bus data. In this case, the first local bus data corresponds to the second local bus data. In the event that a change takes place, the control signal of the processing component controls the logic unit to make a change of the first local bus data or at least a portion or a quantity of the first local bus data so that the first local bus data is different from the second local bus data. The part of the logic unit which is adapted for the modification of the data is preferably not synchronous.

The second local bus data present at the output interface can be instantaneous as compared to the output of the first local bus data output from the input interface to the logic unit, apart from the inherent delay of the components of the logic unit. In an initial period, when the processing component generates a control signal that drives the components of the logic unit to make changes, the changes may initially be unstable. However, in order for a deterministic propagation time behavior of the data bus subscriber and a stable change by the control signal to be ensured in each case and premature transmission of the second local bus data via the output interface to be prevented, the logic unit is preferably adapted for the synchronous delay of the transmission of the second local bus data via the output interface. A time interval caused by the synchronous delay ensures that the instability caused by the changes has ceased.

Advantageously, the synchronous delay is a constant delay. This means that each data bus subscriber or its logic unit delays the transmission of the second local bus data by a constant time or a certain number of working cycles of the processing component or by a constant number of bus clocks of the local bus. For this purpose, the logic unit may have, for example, a number of delay elements corresponding to the number of delayed working cycles/bus clocks. That is, for each working cycle or for each constant time that the transmission of the second local bus data is to be delayed, there is advantageously exactly one delay element. Alternatively, a counter can also be used. For example, a signal can be output from the input interface to the logic unit, which for example confirms the validity of the first local bus data. This signal is delayed by the number of delay elements by a certain constant time or a certain constant number of working cycles/bus clocks before being passed from the logic unit to the output interface. The output interface is advantageously adapted to forward the second local bus data to the downstream data bus subscriber only upon receipt of this signal, which indicates the validity of the first local bus data. In this case, the validity of the first local bus data depends on a hardware check, for example a hardware counter. That is to say, there is a delay of a validity signal but not of the data. This has the advantage that the delay elements can be designed very simply because they do not have to retain the data, but instead only a validity signal, which can be a single bit. The delay elements can accordingly be formed by simple components. The number of delay elements can correspond to the number of working cycles/bus clocks to be delayed. The number of delay elements is selected based on the time required by the processing component to perform processing and to output a corresponding control signal to the logic unit. The output interface is thus adapted to carry out the transmission of the second local bus data only upon receipt of the validity signal. In other words, the output interface waits to transmit the second local bus data until a delayed validity signal is received.

With the data bus subscriber according to the invention, a deterministic propagation time behavior of the data bus subscribers or of the entire local bus is achieved. This means that the time that the process data is processed in the local bus is known to the local bus master and the control unit and depends only on the number of data bus subscribers involved in the local bus. This has the advantage that already with the installation of the local bus, it can be predicted which propagation time this will have. In other words, the propagation time represents a multiple of the processing time of a data bus subscriber. In non-deterministic systems, the propagation time represents the sum of the different processing times of the different data bus subscribers.

The logic unit can be arranged between the input interface and the output interface. The logic unit establishes the connection between the input interface and the output interface. Preferably, the logic unit is connected to the input interface and to the output interface. This ensures that no further units cause a non-deterministic delay in processing.

The working cycle of the processing component can be based on the clock rate of a bus clock of the local bus. For example, the working cycle may be a multiple of the bus dock or even correspond to the bus dock. The working cycle of the processing component indicates with which working cycle the processing component operates and is able to process data. The bus dock indicates in which dock cycle the output interfaces send second local bus data. This dock cycle can be specified by the local bus master, which transmits data to the downstream data bus subscriber of the local bus. It is also conceivable that a data bus subscriber has a certain number of delay elements and the data bus subscriber is configured before or during insertion into the local bus in such a way that it uses only a certain number of these delay elements. This certain number may be adjusted such that all data bus subscribers in the local bus use the same number of delay elements.

The logic unit can have at least one delay element which has a clock input for the time delay of its stored value. The delay element may be, for example, a flip-flop, which can assume two stable states. With the aid of the clock input, the flip-flop can be set up to enable the control inputs only at certain times, i.e., to allow a change of the stored or delayed validity signal only at certain times. Taking into account a dock signal also allows for the flip-flop to be synchronized with the processing component.

The logic unit can have non-clocked logic elements or logic modules. Advantageously, the logic elements have a very short signal propagation delay. The change of the first local bus data by the logic unit is based on the control signal of the processing component, Said signal is not present without a delay because the processing component needs a certain amount of time to process, for example, the first local bus data. Processing in this case can mean that the processing component must execute a particular set of instructions for the particular first local bus data that is currently present. This set of instructions may be stored in the data bus subscriber in the form of a list. Based on the instructions, the processing component is able to generate a control signal instructing the logic unit to make a corresponding change to the first local bus data. The processing component can use an instruction set which contains, for example, the instructions "SKIP", "MOVE", "NEGATION", "INCREMENT", "AND" and "OR" or a combination thereof, wherein the instructions to be executed by means of instruction lists are stored in the data bus subscriber or in a memory to which the data bus subscriber has access. However, the processing or execution of the instructions and the generation of the control signal is clocked and takes a certain amount of time. It can thus be said that the logic elements of the logic unit for changing the first local bus data are non-clocked, but that the behavior of said elements is controlled by a clockdependent control signal. In this case, the control signal can cause either one or no change of the first local bus data to take place. That is, when the control signal drives a change, the first local bus data at the input of the logic unit differs at least partially from the second local bus data at the output of the logic unit. When the control signal controls that no change is to be made, the first local bus data at the input of the logic unit corresponds to the second local bus data at the output of the logic unit.

The input interface can be adapted for serial-parallel conversion and/or decoding of the first local bus data and the output interface is adapted for parallel-serial conversion and/or for encoding the second local bus data. This means that the data on the local bus is transmitted in serial form and possibly encoded. However, the input interface converts the serial data into parallel data streams and optionally decodes these for processing by the processing component or for changes by the logic unit, before second local bus data is subsequently serially converted by the output interface and eventually encoded before being sent to the downstream data bus subscriber. In this case, the input interface can be adapted, for example, for parallel outputting of the first local bus data in the form of a symbol with a fixed number of bits, for example 8 bits, i.e., byte. By means of serial-parallel conversion, a constant number of data bits is present at the logic unit which can be provided changed or unchanged at the logic unit's output almost instantaneously, except for the inherent delay of the components of the logic unit.

The logic unit also can have a bypass connection between input interface and output interface for forwarding first local bus data as second local bus data. This local bus data may contain, for example, control data that cannot or should not be changed by the logic unit. This local bus data via the bypass connection preferably contains no process data.

The above object is also achieved by a method for processing data in a data bus subscriber connectable to a local bus, in particular a ring bus. This means that the data bus subscriber is adapted to be connected to the local bus. The method includes receiving first local bus data at an input interface connectable to the local bus—that is, an input interface adapted to be connected to the local bus—, synchronous processing of the first local bus data and/or data stored in memory by a processing component, outputting of a control signal by the processing component, changing at least a portion of or a quantity of the first local bus data based on the control signal for generating second local bus data to be transmitted by a logic unit, synchronous delay of transmitting the second local bus data via an output interface connectable to the local bus—i.e., an output interface adapted to be connected to the local bus—owing to the logic unit and the transmission of the second local bus data via the output interface after the delay. The change of the first local bus data by the logic unit can be done, for example, in a bit-granular manner. The processing component can in this case use an instruction set which contains, for example, the instructions "SKIP", "MOVE", "NEGATION", "AND", "OR" and "INCREMENT" or a combination thereof, wherein the instructions to be executed by means of instruction lists are stored in the data bus subscriber or in a memory to which the data bus subscriber has access.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
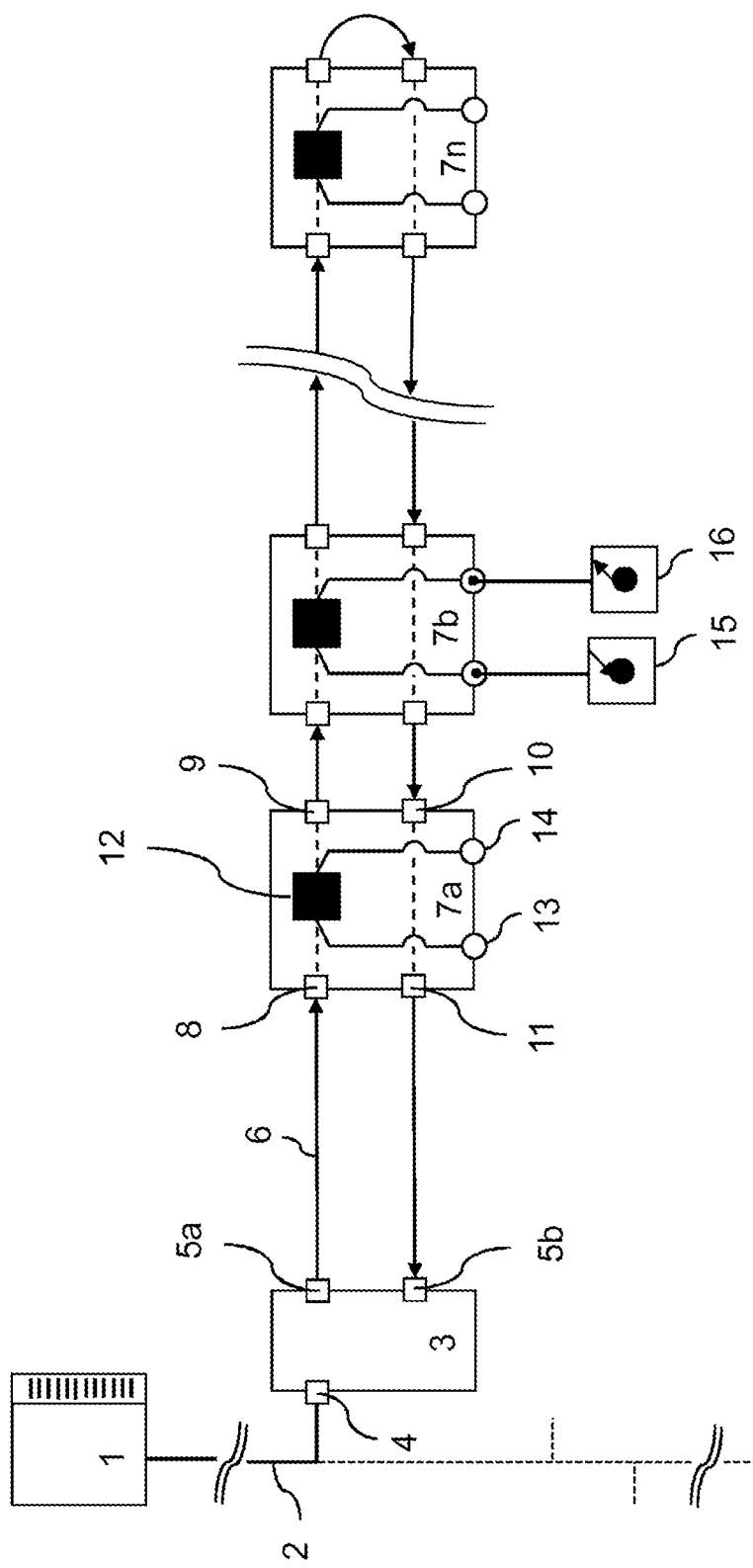
FIG. 1 is a schematic block diagram of an exemplary automation system with a programmable logic control unit and an exemplary ring bus.

FIG. 1 shows a schematic block diagram of an automation system. It will be understood by the person skilled in the art that the automation system shown is only an example and all the elements, modules, components, subscribers and units belonging to the automation system can be configured differently but can nevertheless fulfill the basic functions described herein.

The automation system shown in FIG. 1 has a higher-level control 1, which can be realized for example with a programmable logic control unit, PLC. Such a PLC 1 basically serves to control and regulate the process performed by the automation system. However, PLCs 1 in automation systems today also take on more advanced functions, such as visualization, alerts and recording of all data relating to the process, and as such, the PLC 1 functions as a human-machine interface. There are PLCs 1 with different performance levels, which have different resources (computing capacity, memory capacity, number and type of inputs and outputs, and interfaces) that enable the PLC 1 to control and regulate the process of the automation system. A PLC 1 usually has a modular design and is formed of individual components, each fulfilling a different task. Typically, a PLC 1 includes a central processing unit (with one or more main processors and memory modules) and multiple modules with inputs and outputs. Such modular PLC 1 can be easily expanded by adding modules. It depends on the complexity of the process and the complexity of the structure of the automation system as to which modules must be integrated in the PLC 1. In today's automation systems, the PLC 1 is also usually no longer an independent system, but instead the PLC 1 is connected via appropriate interfaces to the Internet or intranet. This means that the PLC 1 is part of a network through which or from which the PLC 1 can obtain information, instructions, programming, etc. For example, through a connection to a computer located on the intranet or the Internet, the PLC 1 can obtain information about the materials supplied to the process, so that the process can be optimally controlled, for example, by knowing its number or nature. It is also conceivable that the PLC 1 is controlled by a user via access from the intranet or Internet. Thus, for example, a user can access the PLC 1 with the aid of a computer, also called a host computer, and can check, change or correct its user programming. Accordingly, access to the PLC 1 is possible from one or more remote control stations or control centers. If necessary, the host computers can have visualization devices for displaying process sequences.

To control the process of the automation system, the PLC 1 is connected to automation devices. In order to keep the wiring costs low, bus systems are used for these connections. In the exemplary embodiment shown in FIG. 1, the PLC 1 is connected to a local bus master 3 of a subordinate local bus system by means of a higher-level bus 2, which in the exemplary embodiment shown here can be a field bus. However, not only a local bus master 3 of a local bus can be connected to the higher-level bus 2 as in the embodiment shown here, but also any other subscribers which are designed for communication with the PLC 1.

In the exemplary embodiment shown here, the higher-level bus 2 is connected to the local bus master 3. For this purpose, the local bus master 3 has a first interface 4, which is designed such that it can be connected to the higher-level bus 2. For this purpose, the interface 4 can have, for example, a receptacle in the form of a socket and the higher-level bus 2 can have a plug which can be received by the socket. In this case, the plug and the socket, for example, can be a modular plug and a modular socket, i.e., each core of the higher-level bus 2 is electrically or optically connected to a connection in the modular socket. However, the person skilled in the art also knows other ways in which an interface 4 can be designed so that the local bus master 3 can be electrically or optically connected to the higher-level bus 2. The person skilled in the art is familiar with screw, turn, click or plug connections, by means of which an electrical or optical connection can be made. In most cases, a male plug is received by a female counterpart. This receptacle usually does not only establish the electrical or optical connection, but also ensures that the two parts are mechanically coupled and can only be decoupled again with the application of a certain force. But it is also conceivable that the higher-level bus 2 is hardwired to the interface 4.

The local bus master 3 in the embodiment shown here has a further second interface to connect the local bus master 3 with the local bus. Data bus subscribers 7a, 7b. 7n are connected to the local bus or form the latter. The local bus is advantageously configured such that a data packet transmitted by the local bus master 3 is transmitted through all the data bus subscribers 7a, 7b, . . . , 7n connected to the local bus and is sent back to the local bus master 3, Here, a data bus subscriber 7a, 7b, . . . , 7n receives only a portion of the data packet from its upstream data bus subscriber 7a, 7b, . . . , 7n, After a period of time in which the data contained in this portion can be processed by the data bus subscriber 7a, 7b, . . . , 7n, the portion is forwarded to the downstream data bus subscriber 7a, 7b, . . . , 7n and at the same time, a new portion of the data packet is received by the upstream data bus subscriber 7a, 7b, . . . , 7n. In this way, all portions of the data packet sequentially pass through all data bus subscribers 7a, 7b, . . . , 7n. The local bus is advantageously formed in an annular structure. Such local buses can also be referred to as a ring bus 8. The local bus may alternatively be formed strand-shaped or star-shaped or be a combination or hybrid form of the afore-mentioned types. The transmission and reception of the data packets is accomplished via the second interface of the local bus master 3. In the embodiment shown here, the second interface is divided into a first part 5a and a second part 5b. The first part 5a of the second interface establishes the downlink in the ring bus 6 and the second part 5b of the second interface establishes the uplink in the ring bus 6.

In the embodiment shown here, the ring bus 6, the data transmission direction of which is shown with arrows in the exemplary embodiment shown in FIG. 1, includes the data bus subscribers 7a, 7b, . . . , 7n. In the exemplary embodiment shown here, these data bus subscribers 7a, 7b, . . . , 7n each have an interface 8 in order to receive data from an upstream or preceding data bus subscriber 7a, 7b, . . . , 7n. In the case of data bus subscriber 7a, the latter receives data from the upstream local bus master 3 via the interface 8. The data on the local bus 6 can also be referred to as local bus data. Further, in the embodiment shown here, the data bus subscribers 7a, 7b, . . . , 7n each have an interface 9 to forward data to a downstream or subsequent data bus subscriber 7a, 7b, . . . , 7n. In the case of data bus subscriber 7a, the latter sends data to the downstream data bus subscriber 7b via the interface 9. The interfaces 8 and 9 serve to propagate data in the downlink direction of the ring bus 6, i.e., away from the local bus master 3. Further, the data bus subscribers 7a, 7b, . . . , 7n in this embodiment comprise interfaces 10 and 11 for propagating data in the uplink direction of the ring bus 6, i.e., to the local bus master 3. In the case of the data bus subscriber 7a, interface 10 is designed to receive data from the downstream or subsequent data bus subscriber 7b, and interface 11 is designed to forward data to the upstream or preceding data bus subscriber, here the local bus master 3. It can therefore also be said that the interfaces 9 and 11 are transmitter interfaces, whereas the interfaces 8 and 10 are receiver interfaces.

In the embodiment shown here, the connections of the interfaces and of the PLC 1 or the data bus participants 7a, 7b, . . . , 7n are realized by means of cables or printed circuit boards for direct or indirect contacting by electrical contacts. Another alternative is that the individual connections are made wirelessly, and the interfaces provide the necessary conversions to the radio communication standards used.

Even if the local bus master 3 and the individual data bus subscribers 7a, 7b, . . . , 7n in the embodiment shown here are shown spaced from each other, i.e., the local bus master 3 is arranged decentrally from the data bus subscribers 7a, 7b, . . . , 7n, the person skilled in the art is aware that the data bus subscribers 7a, 7b, . . . , 7n and the local bus master 3—which also represents a data bus subscriber of the ring bus 6—can also be connected directly to one another. In this case, for example, contacts of the one data bus subscriber can engage in corresponding receptacles or receptacle contacts of a directly adjacent data bus subscriber so as to establish an electrical connection between the data bus subscribers such that data can be transmitted in the downlink and uplink direction. For example, the data bus subscribers 7a, 7b, . . . , 7n may have receptacles at the side facing away from the master, and contacts on the side facing the master. If the data bus subscribers 7a, 7b, . . . , 7n are then lined up correspondingly, the contacts of the one data bus subscriber 7a, 7b, . . . , 7n each engage in the receptacles of the other data bus subscriber 7a, 7b, . . . , 7n and an electrical connection can be created. The local bus master 3 then has corresponding contacts on the side, which engage in the receptacles of the first data bus subscriber 7a so as to produce an electrical connection between the interfaces 5a and 8 or the interfaces 5b and 11. The person skilled in the art is also aware of other ways, e.g., pressure contacts, knife/fork contacts, of how two, directly adjoining data bus subscribers 7a, 7b, . . . , 7n can establish an electrical or optical connection.

In the case that the data bus subscribers 7a, 7b, ..., 7n and the local bus master 3 are to be connected directly to one another, they can also have mechanical receptacles or mechanical fastener by means of which the individual data bus subscribers 7a, 7b, ..., 7n and the local bus master 3 can be connected to each other. Here, for example, a data bus subscriber 7a, 7n can comprise a projection on one side and an undercut on the other. If the data bus subscribers 7a, 7b, ..., 7n are then lined up, a projection engages in an undercut of the other data bus subscriber 7a, 7b, ..., 7n, such that a mechanical coupling is produced. For the simple juxtaposition of the data bus subscribers 7a, 7b, ..., 7n, these can also be arranged on a common receptacle, for example a DIN rail. For fastening on the DIN rail, the data bus subscribers 7a, 7b, ..., 7n can have a corresponding fastener. Alternatively, or additionally, the data bus subscribers 7a, 7b, ..., 7n can also have, for example, releasably connectable fastener by means of which the data bus subscribers 7a, 7b, ..., 7n can be secured to either the rail or another receptacle. For this purpose, the releasably connectable fastener can be interchangeable and a corresponding fastener for the desired receptacle can be connected to the data bus subscribers 7a, 7b, ..., 7n, such that these can be attached to the desired receptacle.

Figure 3:
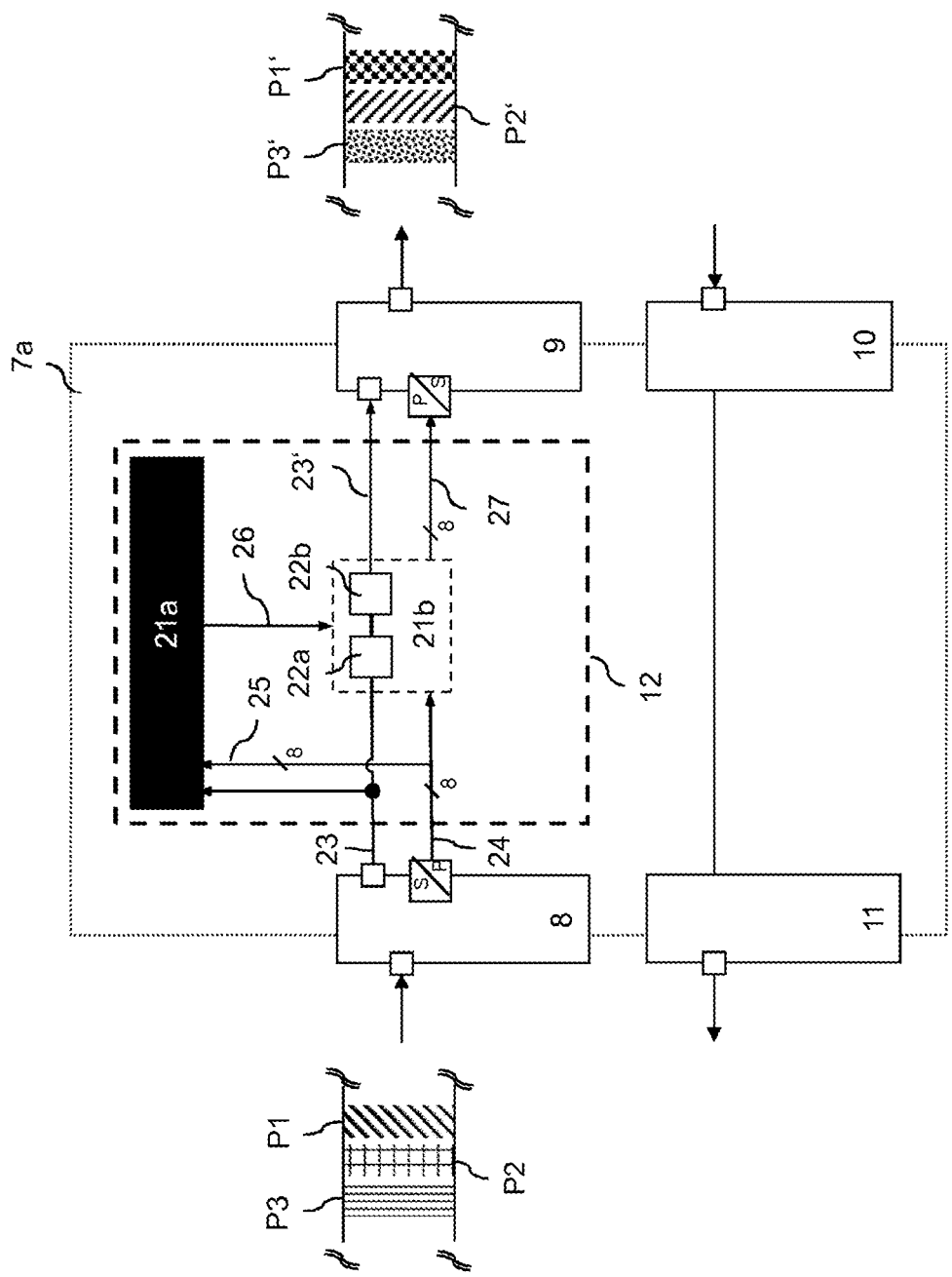
FIG. 3 is a schematic illustration of an exemplary embodiment of a data bus subscriber with a processing unit for processing the data packet shown in FIG. 2.

Further, the data bus subscribers 7a, 7b, ..., 7n in the embodiment shown in FIG. 1 also comprise a processing unit 12 which includes for example a processing component and a logic unit, shown in more detail in FIG. 3. The processing unit 12 may also be referred to as the whole circuit of the data bus subscriber. This means, the processing unit 12 receives data via the inputs 8 and 10 and outputs data at the outputs 9 and 11, In addition, the processing unit 12 can receive or output data from/to the input outputs 13 and 14, respectively. Furthermore, the processing unit 12 has access to a memory of the data bus subscriber 7a, 7b, ..., 7n in which, for example, data, process data, or instruction lists are stored.

The processing unit 12 may be configured to process received data and to output data. Data to be processed can be received either from an upstream data bus subscriber or from inputs 13 of the data bus subscriber 7a, 7b, ..., 7n. In this case, the inputs 13 of the data bus subscriber 7a, 7b, ..., 7n can be connected to sensors 15, which transmit, for example, measurement data, status data, etc. Processed data can be output either to a downstream data bus subscriber or at outputs 14 of the data bus subscriber 7a, 7b, ..., 7n. The outputs 14 of the data bus subscriber 7a, 7b, ..., 7n can be connected to actuators 16, which, for example, perform a particular action by means of the data addressed to them. If processing of the data is also to take place in the uplink direction, data can also be received by a downstream data bus subscriber 7a, 7b, ..., 7n and processed data can be transmitted to an upstream data bus subscriber 7a, 7b, ..., 7n.

For the sake of simplicity, in the exemplary embodiment shown here, the data bus subscribers 7a, 7b, ..., 7n are shown with only one input 13 and one output 14, and only data bus subscriber 7b is connected to sensor 15 and actuator 16. However, it is clear to the person skilled in the art that the data bus subscribers 7a, 7b, ..., 7n may comprise a plurality of inputs and outputs 13 and 14 and can be connected to a plurality of different sensors 15 and actuators 16. In this case, the feature characterizing the sensors 15 is that the sensors 15 receive data or signals and transmit these to the data bus subscriber 7a, 7b, ..., 7n, whereas actuators 16 receive data or signals from the data bus subscribers 7a, 7b, ..., 7n and perform an action based on these data or signals.

Alternatively, the interfaces 8, 9, 10 and 11 can be integrated in one modular unit and the data bus subscribers 7a, 7b, ..., 7n can be plugged onto this modular unit. The modular units can also be referred to as basic elements of the ring bus 6. The ring bus infrastructure is constructed by the modular units and the data bus subscribers 7a, 7b, ..., 7n are interchangeable, so that the ring bus 6 can be constructed with any data bus subscriber 7a, 7b, ..., 7n, With the help of the modular units, it is also ensured that even if a data bus subscriber 7a, 7b, ..., 7n is removed, the communication between the remaining data bus subscribers 7a, 7b, ..., 7n is not interrupted because communication takes place via the remaining modular units.

The data bus subscribers 7a, 7b, ..., 7n shown in this embodiment are also often referred to as I/O modules on account of their inputs and outputs 13, 14 that can be connected to sensors 15 or actuators 16. Even if the data bus subscribers 7a, 7b, 7n shown here in the exemplary embodiment are presented as spatially separated from the sensors 15 or actuators 16, the sensors 15 or actuators 16 can also be integrated in the I/O module.

The ring bus 6 shown in the embodiment shown here is based on a cycle frame communication. A cycle frame can be defined, for example, as a recurring (cyclic) preferably equidistant time interval in which data is transferable on the ring bus 6. The cycle frame has, for example, at least one start identifier (SoC) and a time range for the transmission of data. Several start identifiers (SoC) of successive cycle frames are advantageously at a time equidistant from each other. Said time range is intended for the transmission of the data which can be transmitted within the cycle frame in the form of data packets. The start identifier (SoC) and the data packets are transmitted via the ring bus 6 and pass through all the data bus subscribers 7a, 7b, ..., 7n. Advantageously, the cycle frame is initiated by the local bus master 3 in the ring bus 6. The start identifier (SoC) can be transferred separately, i.e., transferred as an independent symbol or advantageously contained in a start data packet (SoC packet).

Within the time range of the cycle frame, none, one or a plurality of data packets are transmitted. Advantageously, idle data is inserted in a cycle frame, in particular adjacent to at least one data packet. Advantageously, the transmission of the data packets and/or the idle data causes an uninterrupted signal on the ring bus 6. The signal allows for the data bus subscribers 7a, 7b, ..., 7n, to synchronize to this time. Advantageously, the cycle frame additionally has a trailer. The trailer has a variable length and preferably follows the time range for data transmission up to the next start identifier (SoC) of the next cycle frame. Advantageously, the trader comprises idle data.

Each data packet is sent by the local bus master 3 in the downlink direction to the first data bus subscriber 7a of the ring bus 6. This receives a first part of the data packet via the interface 8. Such a part of the data packet is also referred to below as a piece or unit. The data bus subscriber 7a then carries out processing of the part and then forwards the part to the next data bus subscriber 7b via interface 9; preferably at the same time, the first data bus subscriber 7a receives a second part of the data packet, etc. The size of the parts of the data packet, i.e., the splitting up of the data packet, depends on the capacity of the data bus participants 7a, 7b, . . . , 7n, for example, for processing, a fixed number of bits, for example 8 bits of the data packet, may be available at the data bus subscriber 7a, 7n.

Accordingly, the data packet passes through the data bus subscribers 7a. 7b, . . . , 7n unit-wise, piecewise, or partially, for example, in parts or symbols of 8 bits. The part of the data packet which has been processed by the last data bus subscriber, in the exemplary embodiment shown here that is data bus subscriber 7n, then passes in the uplink direction through the ring bus 6, so that the parts are sent upwards again, starting from the last data bus subscriber 7n in the direction of the local bus master 3 through all data bus subscribers 7a, 7b, . . . , 7n, For this purpose, the last data bus subscriber 7n either a switchable bridge that connects the interface 9 to the interface 10, or a switchable bridge is connected to the last data bus subscriber 7n, which takes over the task of passing the parts of the data packet from the interface 9 to the interface 10. Alternatively, the interface 10 of the data bus subscriber 7n may also be connected directly to the interface 5b of the local bus master 3 by means of a bypass line.

In the uplink direction, the units of the data packet or the data packets, as in the embodiment shown here, can be looped back to the local bus master 3 through the single data bus subscribers 7a, 7b, . . . , 7n without any further processing taking place. However, it is also conceivable that processing of the units of the data packet takes place again in the uplink direction, so that the data packet can be processed twice—once in the downlink direction to the last data bus subscriber 7n and once in the uplink direction to the local bus master 3. For example, in the uplink direction, processing can be performed by means of signal refresh and/or phase shift.

During processing of the data packets in the downlink direction, i.e., away from the local bus master 3, or in the uplink direction, i.e., towards the local bus master 3, processing is accomplished by means of instruction lists, wherein the instruction lists include sets of instructions which can be executed by the processing unit 12 of the data bus subscribers 7a, 7b, . . . , 7n. The instruction lists themselves can be sent to the individual data bus subscribers 7a, 7b, . . . , 7n by the local bus master 3 in an initialization phase or, advantageously, can be sent to the data bus subscribers 7a, 7b, . . . , 7n, during ongoing communication so that programming of the data bus subscribers 7a, 7b, . . . , 7n takes place without interrupting the communication.

Which of the instruction lists the data bus subscribers 7a, 7b, . . . , 7n should use can be communicated to the data bus subscribers 7a, 7b, . . . , 7n using an instruction list index. This instruction list index informs the data bus subscribers as to which stored instruction list should be used. Thus, an instruction list index is assigned to an instruction list or vice versa, so that the instruction list to be used can be identified with the aid of the instruction list index. For this purpose, the instruction list index preferably has a value which is assigned to an instruction list, for example, the value indicates a specific instruction list or its memory location. For this purpose, the value itself may be the memory address where the instruction list is stored or where at least a first instruction of the instruction list is stored. Alternatively, or additionally, the value can also indicate a memory area in which the corresponding instruction list is stored. The cases mentioned above can also be referred to as direct assignment. The value of the instruction list index, however, can also be used, for example, as input of a look-up table (LUT). The value of the instruction list index is the input value of the conversion table. The output value of the conversion table may be the memory address of the first instruction in the associated instruction list or may otherwise identify the instruction list. The conversion table can be stored in terms of software technology and hardware in the form of, for example, logics and indicate an one-to-one conversion from an input value to an output value, wherein the output value gives an indication of the instruction list to be used. It depends on the conversion table as to how a connection between the instruction list index and the instruction list is established. When using a conversion table, it is also possible to speak of indirect assignment. In the case of direct and indirect assignment, however, the instruction list to be used by the data bus subscriber is uniquely identifiable, i.e., can be found, by the instruction list index. The instruction list index can be inserted in the data packet prior to the local bus data to be processed so that the data bus subscribers 7a, 7b, . . . , 7n can use the corresponding instruction list in accordance with the order of the local bus data in the data packet. The instruction lists have instructions that are adapted to the order of the local bus data in the data packet. For example, the instruction lists may contain a "SKIP" instruction for local bus data that is not directed to the data bus subscriber 7a, 7b, . . . , 7n, i.e., that instruct the data bus subscriber 7a, 7b, . . . , 7n to skip the corresponding part of the data packet, whereas the instruction list for local bus data directed to the data bus subscribers 7a, 7b, . . . , 7n may have corresponding instructions for processing the local bus data. The processing of the local bus data can thus be decoupled from the actual position of the local bus data in the data packet, since the data bus subscribers are adjusted to the order of the local bus data in the data packet with the aid of the instruction lists. The processing of local bus data by the processing unit 12 is shown in more detail in FIG. 3.

Figure 2:
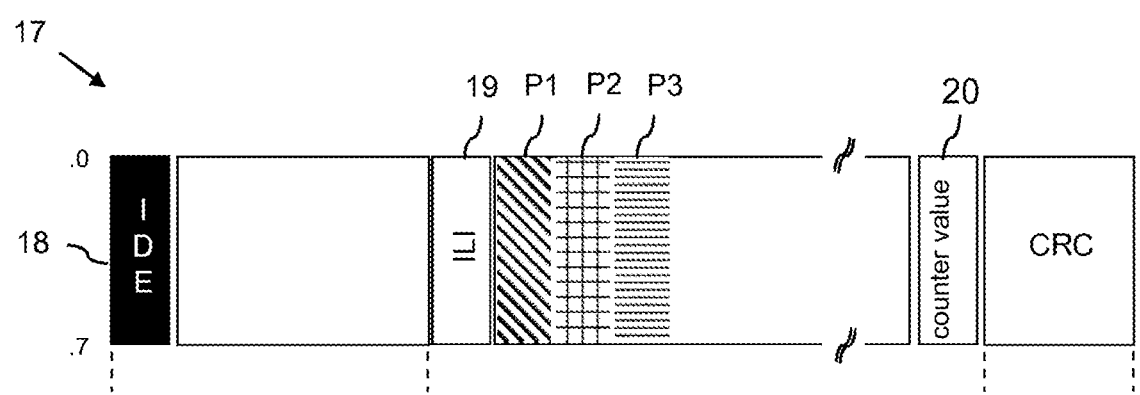
FIG. 2 is a schematic representation of a data packet with local bus data sent by a local bus master.

First, however, a data packet 17 with local bus data P1, P2, P3 used by a local bus master 3 is shown schematically in FIG. 2. The local bus data P1, P2, P3 is formed of, for example, process data. The data packet 17 shown includes a general header, an information part and a checksum part.

The header includes a field 18 which contains a unique one-time bit pattern IDE, which may also be referred to as a code word or packet identifier. The number and the configuration of unique bit patterns or code words depend on the coding used on the ring bus 6. Alternatively, or additionally, however, special bit patterns or code words can also be defined in the bus protocol used. It is only important that the data bus subscribers 7a, 7b, . . . , 7n can uniquely recognize from the bit pattern or code word of the field 18 what type of data packet 17 is involved. The code word of the field 18 is forwarded directly, for example, via a bypass connection. In the embodiment shown here, the data bus subscribers 7a, 7b, . . . , 7n know that when a field 18 with a bit pattern IDE is received, it is a data packet 17 carrying process data P1, P2, P3.

The header may also include other information indicating, for example, whether the data packet 17 is moving in the downlink or uplink direction. For this example, the last data bus subscriber 7n can write the information to the header that the data packet 17 has already passed through this data bus subscriber 7n and has been sent back towards local bus master 3. In addition, the header can also contain information regarding the length of the data packet 17 so that the data bus subscribers 7a, 7b, . . . , 7n can verify the integrity of the data packet 17 or know how many parts of the data packet 17 will still be received from the data bus subscriber 7a, 7b, . . . , 7n before a new data packet 17 launches. The person skilled in the art is also knowledgeable of other fields which can be written to a header of a data packet 17, which can be used for control or error detection by the data bus subscribers 7a, 7b, . . . , 7n.

The information part of the data packet 17 may first comprise an instruction list index field 19, ILI, which indicates which instruction list the data bus subscribers 7a, 7b, . . . , 7n should use. For example, it can be provided in normal operation of the ring bus 6 that all data bus subscribers 7a, 7b, . . . , 7n use their first instruction list, whereas in the event of an error, the second instruction list is to be used. In this case, the instruction list index can directly indicate the memory location of the instruction list stored in the data bus subscriber 7a, 7b, . . . , 7n, or the instruction list index can contain a value by means of which the data bus subscriber 7a, 7b, . . . , 7n, can find the appropriate instruction list, for example, via a conversion table. The information part further has the actual process data P1, P2 and P3. In the embodiment shown here, this process data P1, P2, P3 is presented with different patterns.

In the embodiment shown here, the data packet 17 is divided into symbols of 8 bits each. In this split, too, the data packet 17 is received and processed by the data bus subscribers 7a, 7b, . . . , 7n. That is, first the local bus master 3 sends the symbol or field IDE 18 to the first data bus subscriber 7a; after a predetermined time, the local bus master 3 sends another symbol of the header of the data packet 17 to the data bus subscriber 7a, which in turn simultaneously transmits the symbol or field IDE 18 to the data bus subscriber 7b. This predetermined time between transmission and reception of the symbols of the data packet can also be referred to as clocking of the local bus, i.e., as a bus clock. The transmitting and receiving can be done at each clock cycle or may take several cycles to complete.

In addition, the data packet 17 has a field 20 in the information part, which may be configured as a counter and which can be incremented or decremented by each data bus subscriber 7a, 7b, . . . , 7n through which this part of the data packet 17 has already passed. The counter value of the field 20 can be used by the local bus master 3 to check whether the data packet 17 has passed through all the data bus subscribers 7a, 7b, . . . , 7n.

The data packet 17 shown in FIG. 2 has a unique bit pattern 18 and ends with a checksum. However, the person skilled in the art is aware that a cycle frame may include multiple data packets that are organizationally included within a cycle frame. Data packets themselves can be identified by a unique prefixed bit pattern.

In the exemplary embodiment shown here, the data bus subscribers 7a, 7b, . . . , 7n are configured to assess that when a data packet with the bit pattern IDE 18 is received, this data packet carries process data P1, P2, P3, . . . , PN. The processing of local bus data exemplified by the process data P1, P2, P3 is shown in more detail in FIG. 3.

FIG. 3 shows a schematic illustration of an exemplary embodiment of a data bus subscriber 7a of the ring bus 6 shown in FIG. 1 for processing a data packet 17 shown in FIG. 2 using the process data P1, P2, P3 as local bus data.

In the exemplary embodiment shown here, the data bus subscriber 7a has an input interface 8 which symbolically receives the data packet 17 symbol as shown in FIG. 2 in the downlink direction; this data packet can also be referred to as a local bus data packet or local bus data. In the case of data bus subscriber 7a, this receives the local bus data from the upstream local bus master 3 via the input interface 8. In the embodiment described here, the local bus data is received serially at the input interface 8. This means that the local bus data is received in succession, in particular bit-by-bit. In the exemplary embodiment shown in FIG. 3, further components may be arranged in the input interface 8. For example, a decoder may also be integrated at or in the input interface 8, which is capable of decoding an encoded input signal. Furthermore, it is shown in FIG. 3 that at least one serial-parallel converter, which converts the serially received part of the data packet 17 to a parallel data stream 24, is integrated in the input interface 8. For example, the serial-parallel converter can convert the symbols of the data packet 17 to an 8-bit parallel data stream 24. This parallel data stream 24 is then supplied to the processing unit 12 and can accordingly also be referred to as a parallel input data stream 24.

In addition, the input interface 8 may output a validity signal 23, indicating that the data was received without error. The validity signal 23 is also supplied to the processing unit 12 and in particular also to the processing component 21a.

In the exemplary embodiment shown here, the processing unit 12 has a processing component 21a and a logic unit 21b. The parallel data stream 24 generated by the serial-parallel converter is supplied to the processing component 21a and to the logic unit 21b. The processing component 21a is set up to evaluate the ILI 19 received prior to the process data P1, P2, P3 and to control which instruction list and thus which instructions must be processed for the subsequent process data P1, P2, P3. With the aid of these instructions and the supplied parallel data stream 25, the processing component 21a is set up to generate a control signal 26. This control signal 26 controls the logic unit 21b to change or manipulate the applied parallel data stream 24. The logic unit 21b, which may also be referred to as a manipulation unit, is set up to generate a modified parallel data stream 27 based on the control signal 26. This modified parallel data stream 27 is supplied to the output interface 9 and, accordingly, can also be referred to as a parallel output data stream 27. The parallel data stream 24 corresponds to the first local bus data at the input interface 8 at any given time, for example, this parallel data stream 24 at time $\tau=1$ corresponds to the 8-bit of the first process data P1. The parallel data stream 24 thus represents the 8-bit of the first local bus data P1 at the time $\tau=1$ Almost without delay, the parallel data stream 27 is also provided by the logic unit at the time $\tau=1$, i.e., the second local bus data P1' at the output interface 9. Since no change in the first local bus data P1 has taken place at this time, the parallel data streams 24 and 27 still correspond at this time. However, after the logic unit 21b has received the control signal 26 of the processing component 21a, the first local bus data P1 is changed to the second local bus data P1, so that at the time $\tau=1'$, the first local bus data P1 no longer corresponds to the second local bus data P1', at least under the condition that the control signal 26 controls a change of the first local bus data P1. The same applies to $\tau=2/2''$ with the process data P2 and $\tau=3/3'$ with the process data P3. That is to say, even if below, the first local bus data is always overall referred to as P1, P2, P3 or the second local bus data is overall referred to as P1, P2', P3', the person skilled in the art is aware that the individual process data P1, P1', P2, P2', P3, P3'' is in each case always associated with a certain time $\tau=1/1'$, $\tau=2/2'$, $\tau=3/3'$, etc. because at any given time, a data bus subscriber 7a, 7b, . . . , 7n only ever has and can process a part of the data packet 17. The following description must therefore always be viewed considering the temporal component.

Since the logic unit 21b is formed of logic elements, there is almost no delay for the signal flow between input and output of the logic unit 21b. This means that if the first local bus data P1, P2, P3 is present at the input of the logic unit 21b, it is output almost without delay at the output of the logic unit 21b as second local bus data P1″, P2′, P3′. In this case, the first local bus data P1, P2, P3 (still) corresponds to the second local bus data P1′, P2′, P3′ because the logic unit 21b has not yet made any changes to the first local bus data P1, P2, P3. Only by a control signal 26 generated by the processing component 21a, which is supplied to the logic unit 21b, is a change of the first local bus data P1, P2, P3 made. The processing component 21a is set up to carry out predetermined processing with the process data P1, P2, P3 on the basis of instructions in its instruction list, wherein the corresponding list has been selected in the data packet 17 with the aid of the ILI 19. However, to generate the control signal 26 and execute the instructions in the instruction list, the processing component 21a needs time. However, the logic unit 21b can provide the parallel data stream 24 as parallel data stream 27 at the output interface 9 almost without delay. So that the output interface 9 does not prematurely convert the parallel data stream 27 into a serial signal due to the parallel-serial converter arranged at the output interface 9 and send said signal to the downstream data bus subscriber 7b, the output interface 9 is configured to transmit only when the output interface 9 receives a validity signal 23 of the logic unit 21b.

The output interface 9 may also include an encoder to appropriately encode the serial data stream according to system requirements. The validity signal 23′ at the input of the output interface 9 is based on the validity signal 23, which is output from the input interface 8 to the logic unit 21b. So that the processing component 21a has sufficient time to generate the control signal 26 and the logic unit 21b can change the first local bus data P1, P2, P3 to the second local bus data P1′, P2′, P3″ by means of the control signal, the logic unit 21b delays the validity signal 23 of the input interface 8. For this purpose, the logic unit 21b has a number of delay elements 22a, 22b, which delay the validity signal 23 for a certain constant time until it is applied as a delayed validity signal 23′ at the output interface. The length of the delay depends on the number of delay elements 22a, 22b. In the embodiment shown here, the two delay elements 22a, 22b correspond to a delay of two working cycles of the processing component 21a. The processing component 21a thus has two working cycles to generate the control signal and to control the logic unit 21a in such a way as to change the process data P1, P2, P3, before the delayed validity signal 23′ is forwarded to the output interface 9 and the second local bus data P1′, P2′, P3′ is sent to the next data bus subscriber 7b. Although only two delay elements 22a, 22b are shown here, the person skilled in the art is aware that any number of delay elements 22a, 22b may be used. In order to ensure a deterministic behavior of the ring bus 6, it is only important that the data bus subscribers 7a, 7b, . . . , 7n each have a constant delay, i.e., a constant number of delay elements 22a, 22b. In this example, it is preferred if all data bus subscribers 7a, 7b, . . . , 7n have the same number of delay elements 22a, 22b.

In the embodiment shown here, only processing of the local bus data P1, P2, P3 is carried out in the downlink direction, i.e., in each case between the interfaces 8 and 9. In the uplink direction, i.e., between the interfaces 10 and 11, no re-processing takes place. This is indicated in that the interfaces 10 and 11 are directly connected. However, the person skilled in the art is aware that processing of the local bus data P1, P2, P3 or of the then already processed local bus data P1′, P2′, P3′ corresponding to the downlink direction can also take place in the uplink direction. For this purpose, the data bus subscriber 7a can have a further unit corresponding to the processing unit 12, or the processing unit 12 itself can be used.

In the exemplary embodiment shown here, it is also shown that all local bus data P1, P2 and P3 is processed by the data bus subscriber 7a, which is represented by the changed pattern. However, it will be appreciated by the person skilled in the art that the processing component 21a may also include instructions that may instruct the logic unit 21b not to make any changes. In this case, the first local bus data P1, P2, P3 corresponds to the second local bus data Pt, P2′ and P3′. Nevertheless, the validity signal 23 is delayed for a certain time by the delay elements 22a, 22b before being passed to the output interface 9. Thereafter, the output interface 9 transmits the unprocessed local bus data P1, P2, P3 to the downstream data bus subscriber 7b.

Figure 4:
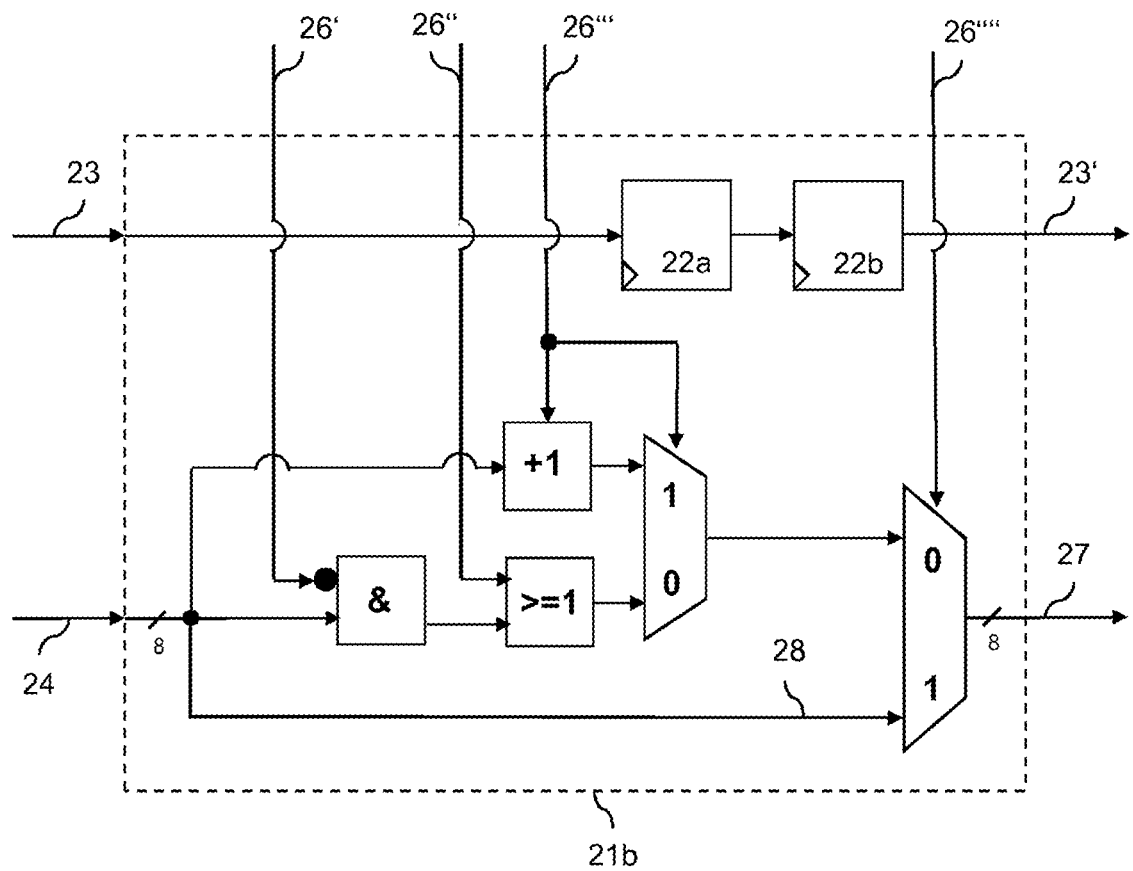
FIG. 4 is a schematic block diagram of an exemplary embodiment of a logic unit of the data bus subscriber shown in FIG. 3.

FIG. 4 shows a detailed view of the logic unit 21b for changing the local bus data P1, P2, P3. FIG. 4 shows an example of various logic elements of the logic unit 21b through which the parallel input data stream 24 is guided to produce a parallel output data stream 27. In the embodiment of FIG. 4, the input data stream 24 and the output data stream 27 has a width of 8 bits. In this case, the various logic elements of the logic unit 21b are adapted to receive a control signal 26 of the processing component 21a and to perform changes to the parallel input data stream 24 in accordance with its logic function. In the embodiment shown here, the control signal 26 comprises four individual control signal components 26′, 26″, 26′″, 26″ generated by the processing component 21a to control the four logic elements of the logic unit 21b shown here only by example. The control signal 26″″ controls a multiplexer, which outputs the first local bus data 24 via the bypass line 28 as second local bus data 27 at a logical one. On the other hand, at a logical zero, the second local bus data is formed by the upstream logic. The control signal 26′″ controls another multiplexer and an adder for incrementing the first local bus data 24. When the control signal 26′″ is at a logical zero, the output values of OR gates are output as second local bus data. The control signal 26″ is input to inputs of the OR gates. The control signal 26′ is input inversely to inputs of the AND gates. The OR gates and the AND gates implement the delete and set functions. In the representation in FIG. 4, there are 8 OR gates and 8 AND gates, wherein only one OR gate and one AND gate are shown for ease of understanding. However, the person skilled in the art will be aware that also other logic elements than the ones shown herein may be present and that these can be controlled by only one or by more than one control signal.

If the input data stream 24 contains no process data P1, P2, P3, but instead, for example, control data which is intended only for the processing component 21a but requires no change, then the logic unit 21b also has a bypass line 28 with which the local bus data can be routed past the logic elements. For example, a packet identifier (e.g., IDE) is looped through the bypass line as control data.

In addition, in the embodiment shown here, the logic unit 21b has two delay elements 22a and 22b that delay the validity signal 23 for a specified time until said delayed validity signal 23′ is forwarded to the output interface 9. The delay elements 22a and 22b may be, for example, level-triggered flip-flops and may store one bit for the duration of one clock cycle. As already described above, a clock cycle preferably corresponds to a working cycle of the processing component 21a, which may be a multiple of the clock cycle of the ring bus 6 or may even correspond to this. Only when the delayed validity signal 23′ is received at the output interface 9, this sends the second local bus data P1", P2', P3' changed by the logic elements of the logic unit 21b to the next data bus subscriber 7b in the ring bus 6.

The components of the device according to the invention disclosed in the described embodiment as separate units, modules or interfaces can be implemented as separate hardware, but are preferably integrated on the same semiconductor chip. Preferably, their function is implemented by a hardware of logic gates. For example, the units, modules, or interfaces may be implemented on an FPGA ASIC.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A data bus subscriber for processing data, the data bus subscriber being connectable to a local bus, in particular a ring bus, the data bus subscriber comprising:
   an input interface connectable to the local bus for receiving first local bus data;
   an output interface connectable to the local bus for transmitting second local bus data;
   a processing component for clock-controlled processing of the first local bus data and for outputting at least one control signal; and
   a logic unit adapted to change a quantity of the received first local bus data based on the control signal for generating the second local bus data to be transmitted,
   wherein the logic unit is further adapted for clock-controlled delaying of transmission of the second local bus data via the output interface,
   wherein a working clock cycle of the processing component corresponds to a clock rate of a bus clock of the local bus or is a multiple of the clock rate of the bus clock of the local bus, and
   wherein the clock-controlled delay is a constant delay in which the logic unit delays the transmission of the second local bus data by a certain number of working cycles of the processing component.

2. The data bus subscriber according to claim 1, wherein the logic unit is arranged between the input interface and the output interface.

3. The data bus subscriber according to claim 1, wherein the logic unit comprises at least one delay element having a clock input for temporal clock-controlled delay of transmission of the second local bus data.

4. The data bus subscriber according to claim 1, wherein the input interface is adapted for serial-parallel conversion and/or for decoding the first local bus data.

5. The data bus subscriber according to claim 4, wherein the input interface is adapted for parallel outputting of the first local bus data in the form of a symbol with a fixed number of bits, in particular 8 bit.

6. The data bus subscriber according to claim 1, wherein the output interface is adapted for parallel-serial conversion and/or for coding the second local bus data.

7. The data bus subscriber according to claim 1, wherein the logic unit is adapted to:
   set a number of bits in the first local bus data,
   delete a number of bits from the first local bus data,
   increment a number of bits in the first local bus data,
   buffer an overflow bit from the first local bus data, or
   a combination thereof for generating the second local bus data.

8. The data bus subscriber according to claim 1, wherein the first local bus data is received as part of a cycle frame from the input interface.

9. The data bus subscriber according to claim 1, wherein the second local bus data is output as part of a cycle frame from the output interface.

10. The data bus subscriber according to claim 1, wherein the processing component is further adapted to:
    within a delay generated by the logic unit, process the first local bus data and output the control signal to the logic unit for generating the second local bus data.

11. The data bus subscriber according to claim 1, further comprising:
    a controllable bypass connection between input interface and output interface for forwarding local bus data.

12. The data bus subscriber according to claim 1, wherein the logic unit comprises non-clock-controlled logic elements which are controlled by the control signal for changing the first local bus data.

13. The data bus subscriber according to claim 1, wherein the ring bus is based on a cycle frame communication.

14. A method for processing data in a data bus subscriber connectable to a local bus, in particular a ring bus, the method comprising:
    receiving first local bus data at an input interface connectable to the local bus;
    clock-controlled processing of the first local bus data by a processing component;
    outputting a control signal by the processing component;
    changing a quantity of the received first local bus data based on the control signal for generating second local bus data to be transmitted by a logic unit;
    clock-controlled delaying of transmission of the second local bus data via an output interface connectable to the local bus caused by the logic unit; and
    transmitting the second local bus data via the output interface after the delaying,
    wherein a working clock of the processing component corresponds to a clock rate of a bus clock of the local bus or is a multiple of the clock rate of the bus clock of the local bus and
    wherein the clock-controlled delay is a constant delay in which the logic unit delays the transmission of the second local bus data by a certain number of working cycles of the processing component.

15. A data bus subscriber for processing data, the data bus subscriber being connectable to a local bus, in particular a ring bus, the data bus subscriber comprising:
    an input interface connectable to the local bus for receiving first local bus data;
    an output interface connectable to the local bus for transmitting second local bus data;
    a processing component for clock-controlled processing of the first local bus data and for outputting at least one control signal, wherein a working clock cycle of the processing component is based on the clock rate of a bus clock of the local bus; and
    a logic unit adapted to change a quantity of the received first local bus data based on the control signal for generating the second local bus data to be transmitted,
    wherein the logic unit is further adapted for clock-controlled delaying of transmission of the second local bus data via the output interface,
    wherein the logic unit is adapted to output a validity signal to the output interface,
    wherein the validity signal is delayed in a clock-controlled manner by the logic unit, and wherein the output interface to the local bus is adapted to transmit the second local bus data only upon receipt of the validity signal.

16. The data bus subscriber according to claim 1, wherein the logic unit is adapted to output a validity signal to the output interface.

17. The data bus subscriber according to claim 16, wherein the validity signal is delayed in a clock-controlled manner by the logic unit.

18. The data bus subscriber according to claim 1, wherein the logic unit has a number of delay elements corresponding to a number of delayed working cycles or bus clocks.

19. The data bus subscriber according to claim 1, wherein for each working cycle that the transmission of the second local bus data is delayed, the logic unit includes exactly one delay element.

* * * * *